No. 755,533. PATENTED MAR. 22, 1904.
G. J. PATTON & S. A. MARSTELLER.
MOWER.
APPLICATION FILED APR. 9, 1903.
NO MODEL. 3 SHEETS—SHEET 1.
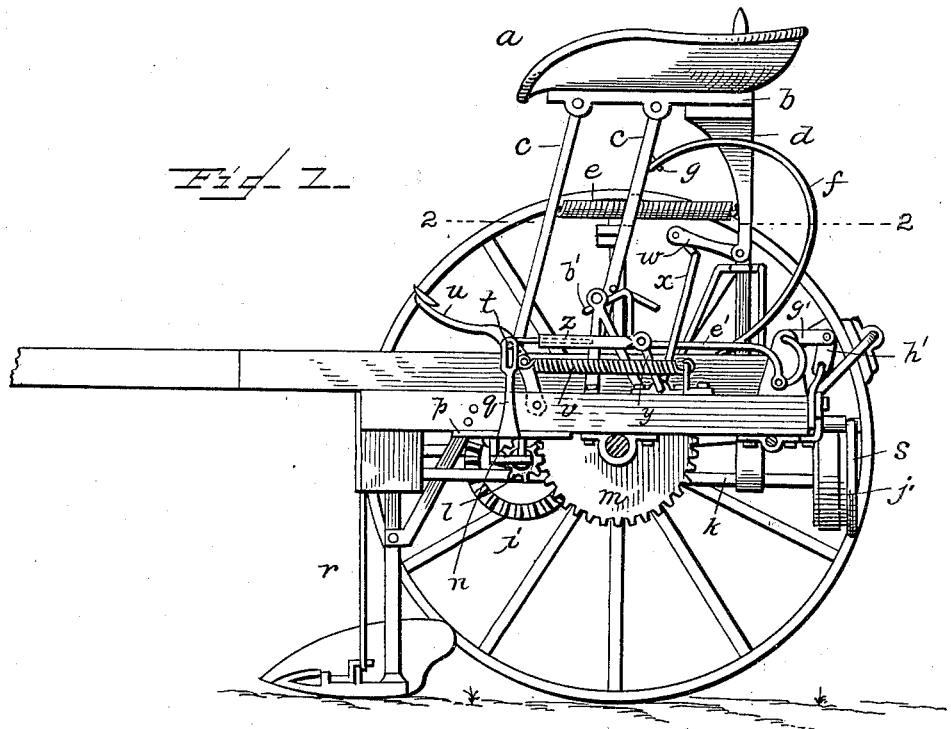
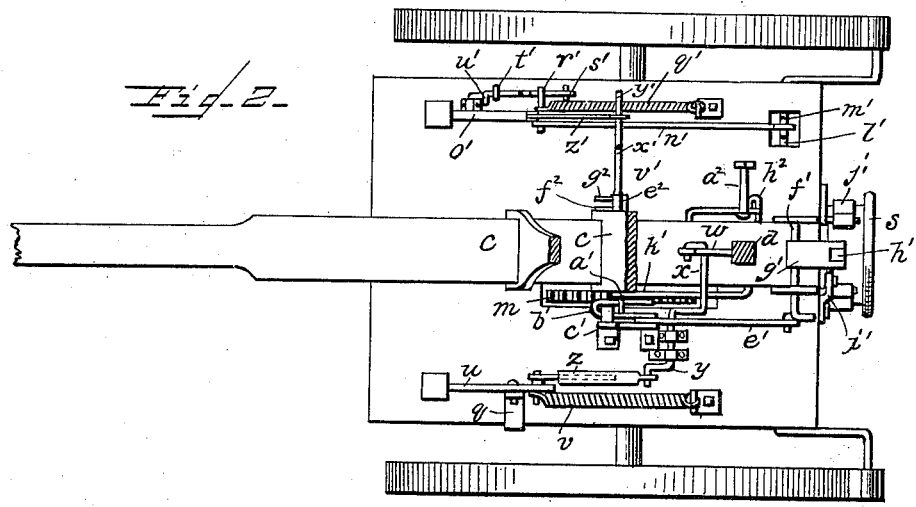
WITNESSES
Edwin L. Yewell
R. H. Bishop
INVENTORS,
George J. Patton
Stell A. Marsteller
By Davis & Davis,
Attorneys.

No. 755,533. PATENTED MAR. 22, 1904.
G. J. PATTON & S. A. MARSTELLER.
MOWER.
APPLICATION FILED APR. 9, 1903.
NO MODEL. 3 SHEETS—SHEET 2.
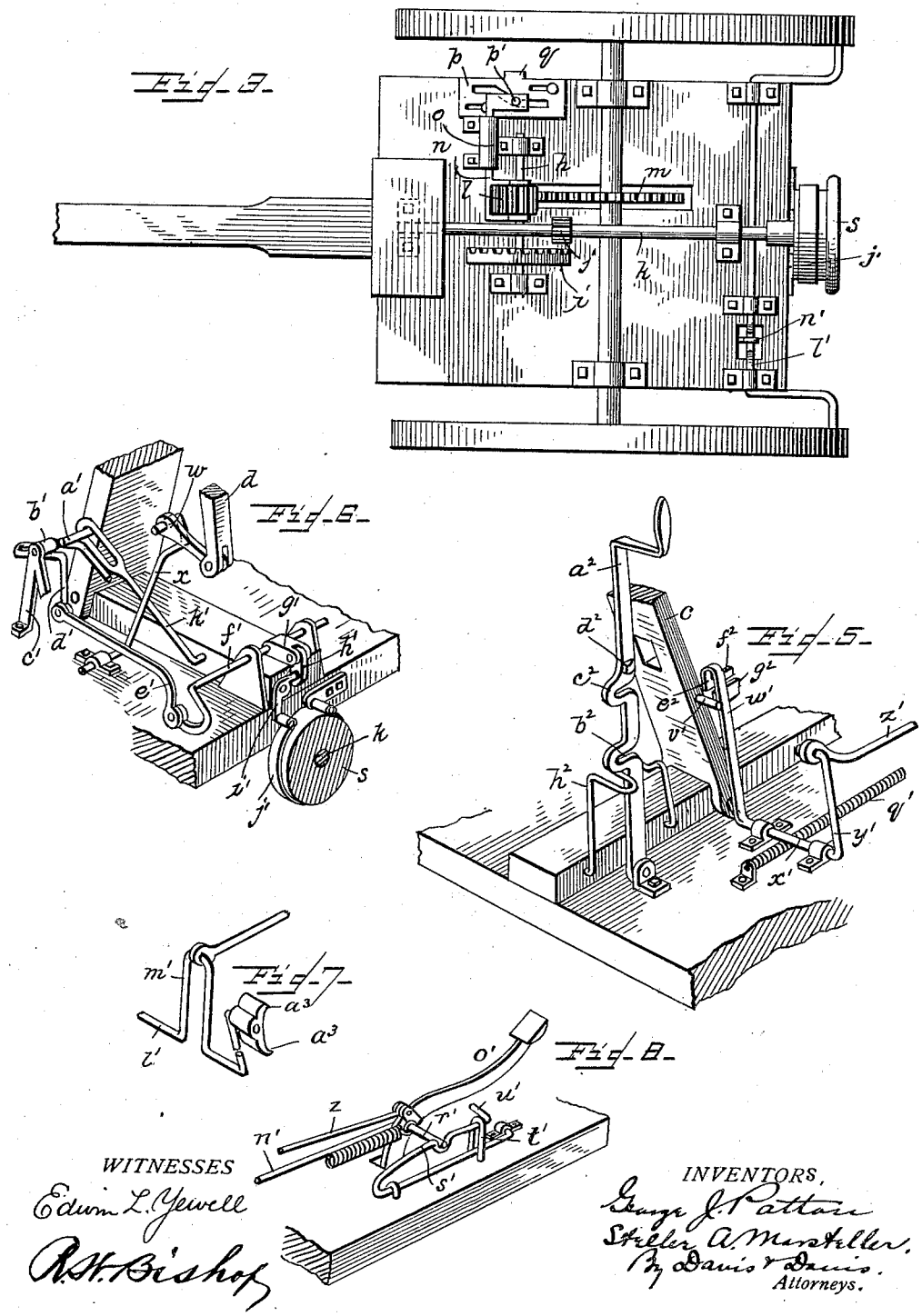
WITNESSES
INVENTORS,
Attorneys.

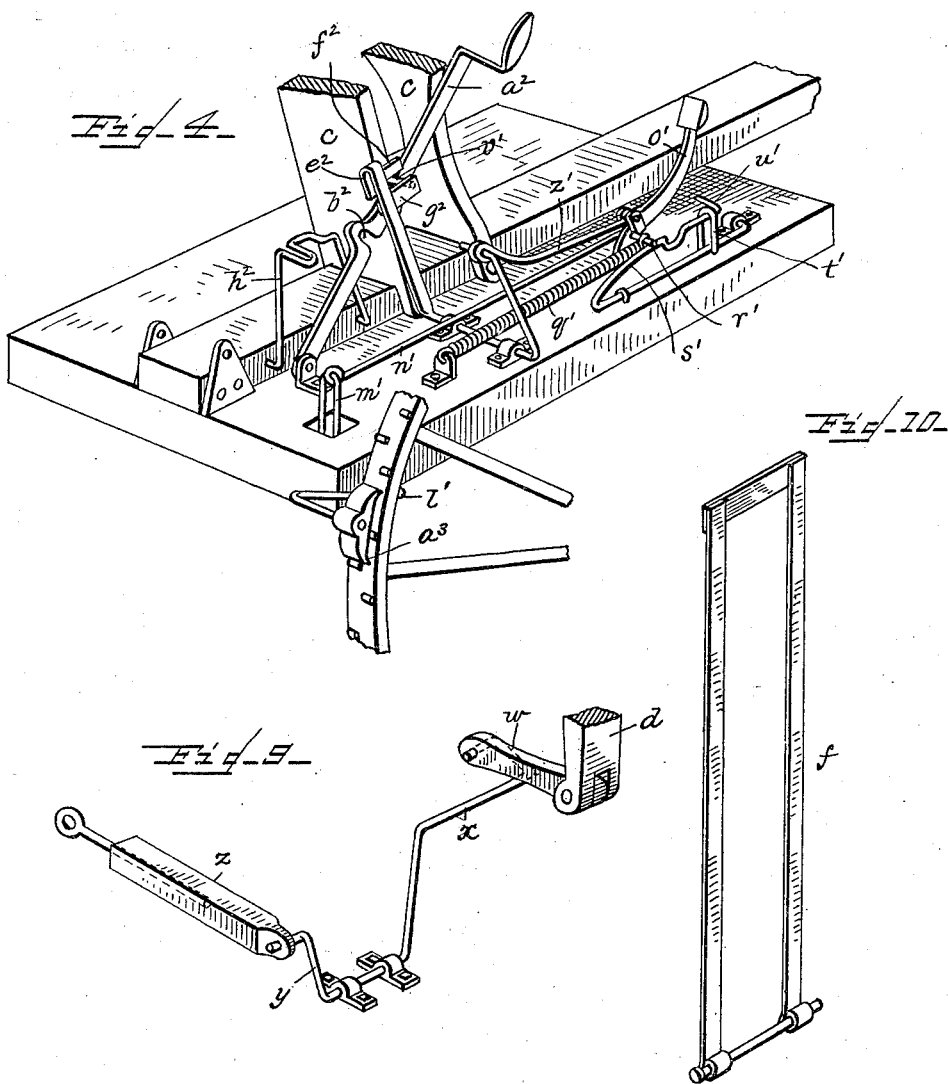

No. 755,533. Patented March 22, 1904.

UNITED STATES PATENT OFFICE.

GEORGE JOSEPH PATTON AND STELLER A. MARSTELLER, OF NOKESVILLE, VIRGINIA.

MOWER.

SPECIFICATION forming part of Letters Patent No. 755,533, dated March 22, 1904.

Application filed April 9, 1903. Serial No. 151,790. (No model.)

*To all whom it may concern:*

Be it known that we, GEORGE JOSEPH PATTON and STELLER A. MARSTELLER, citizens of the United States of America, and residents of Nokesville, Prince William county, State of Virginia, have invented certain new and useful Improvements in Mowers, of which the following is a full, clear, and exact description, reference being had therein to the accompanying drawings, in which—

Figure 1 is a side elevation of a mower provided with our invention, one of the wheels being removed; Fig. 2, a sectional view on the line 2 2 of Fig. 1 looking downward; Fig. 3, a bottom view; Fig. 4, a detail perspective showing the manner of locking the seat and freeing the wheel-braking mechanism, so that it may be operated by the foot of the driver; Fig. 5, a detail perspective showing the means for engaging the wheel-braking devices with the seat-standard; Fig. 6, a detail perspective showing more especially devices for automatically braking the cutter-driving mechanism; Fig. 7, a detail view of part of the wheel-brake; Fig. 8, a detail perspective showing the manner of locking the wheel-brakes against the wheels; Fig. 9, a detail perspective showing the devices for automatically disengaging the driving mechanism; Fig. 10, a detail view of a supplemental spring adapted to be attached to the seat.

It is well known that many accidents have occurred in using mowers by the driver being accidentally thrown from his seat over upon or in front of the cutter-bar, and this danger is greatly increased in operating the mower in rough fields, especially as the grass often hides the depressions and obstructions and the driver is subjected to the jar without warning.

It is the object of our invention to absolutely do away with this danger, and in attaining this object we provide means whereby when the seat is relieved of the driver's weight devices will be automatically operated whereby the driving mechanism will be thrown out of gear and at the same time braked and also a brake applied to the transporting-wheels of the mower, whereby the cutter will be stopped instantly and the machine also will be stopped, as more fully hereinafter set forth.

Referring to the drawings annexed by the reference-letters, $a$ designates the driver's seat, which is attached to a horizontal plate $b$, which in turn is pivotally connected to a pair of parallel standards $c$, whose lower ends are suitably pivoted to the frame of the machine. Depending from the rear end of the plate $b$ is a finger or bracket $d$, and connecting the lower end of this bracket with the front of one of the standards is a contractile spring $e$, which passes through a hole in the rear standard. The contractile action of this spring normally holds the standards upright, and the parallel arrangement of the standards maintains the seat in a horizontal position at all times. If additional resistance is required, as when a heavy man is to drive, a supplemental seat-spring $f$ is preferably employed, this spring consisting, preferably, of a pair of spring members connected together at their upper and lower ends by cross-bars, this supplemental spring being applied as shown in Fig. 1, its upper end engaging with a pin $g$ on the rear face of the rear standard and its lower end suitably engaged with the frame of the machine. This spring may be readily detached by disengaging its upper end from pin $g$.

The cutter-bar-driving mechanism consists of any suitable gearing, that shown consisting of the transverse counter-shaft $h$, provided at one end with a crown-gear $i$, adapted to engage a pinion $j$ on the main driving-shaft $k$, and at its other end with a broad-faced pinion $l$, engaging the driving-gear $m$ on the axle. This shaft $h$ is slidably mounted, so that the crown-wheel $i$ may be disengaged from pinion $j$, and this shaft is moved endwise by means of a sliding bar $n$, which is mounted in a bearing $o$. The outer end of bar $n$ is provided with a pin $p'$, which is engaged by the inclined slot of a shifting plate $p$, slidably mounted on the bottom of the frame and provided with an upright arm $q$, the upper end of which extends above the frame of the machine and is vertically slotted.

The front end of shaft $k$ is connected by the usual pitman $r$ to the cutter-bar and its rear end is provided with a fly-wheel $s$, the object of this fly-wheel being to steady the movement of the cutter and store up power that will serve to run the cutter in turning the mower, so as to avoid leaving uncut any of the grass.

Working in the slot in the upper end of arm $q$ is a pin $t$, projecting laterally from a foot-lever pivoted on the frame, whereby by depressing the forward end of the foot-lever the sliding plate $p$ may be slid forward and the crown-wheel $i$ disengaged from the driving-pinion. To normally draw back the foot-lever, and thereby tend to normally hold the crown-wheel in engagement, a coil-spring $v$ is attached at its forward end to the foot-lever and at its rear end to a stationary part of the frame.

To disengage the crown-wheel by the upward movement of the seat, the following devices are employed: Attached to the lower end of the hanger $d$ is a pivotal link $w$, and pivotally connected to the forward free end of this link is the upper end of a crank $x$, pivotally supported on the frame, and attached to or formed on this crank is another crank $y$, the upper end of which is pivotally connected to a rod $z$, which extends forward and is pivotally connected to the foot-lever $u$. The rod $z$ is formed of two telescoping parts, whereby the foot-lever may be operated independently of the automatic devices.

While the seat is normally elevated the connecting-rod $z$ will be pushed forward and the driving mechanism normally held out of engagement. When the seat is depressed by the weight of the driver, the rear section of the telescopic rod $z$ is drawn backward, thereby allowing the spring $v$ to draw back the foot-lever and automatically throw the gearing into engagement.

To brake the driving mechanism, the following devices are employed: Projecting laterally from the rear standard is a pin $a'$, which engages the upper face of a cam $b'$, pivotally mounted upon a stationary bracket $c'$ and having a dependent arm $d'$, whose lower end is pivotally connected with a rod $e'$, which in turn is connected to a crank on a rock-shaft $f'$, mounted transversely of the machine-frame. Secured to this rock-shaft is an arm $g'$, to the rear end of which is pivotally connected a depending link $h'$, whose lower end is pivotally and slidably connected to a bell-crank lever $i'$, the depending end of this lever being connected to the free end of a brake-band embracing the fly-wheel $s$, this brake-band being arranged to normally clasp the wheel. When the seat is in its normal or elevated position, the brake-band is free to clasp the brake-wheel, and thereby stop the cutting apparatus the instant it is thrown out of gear by the devices heretofore described; but when the seat is depressed the pin $a'$ depresses the rear end of cam $b'$, and thereby rocks shaft $f'$ and through the medium of the connecting devices described expands the brake-band $j''$ and releases the wheel, leaving the mechanism free to be operated.

To limit the movement of the seat, a rod $k'$ is pivotally connected to the frame and extended upward and forward and provided with a slot, in which works the pin $a'$; but of course any other suitable device may be employed for this apparatus.

The wheel-braking devices are constructed as follows: The brake-shoes are carried on the ends of cranks carried by a rock-shaft $l'$, journaled on the under side of the rear end of the frame and provided with a crank-arm $m'$, extending up through an opening in the frame and connected by a link $n'$ to a foot-lever $o'$, pivoted to the frame near its forward end. To normally draw back the foot-lever and remove the brakes from the wheel, a coil-spring $q'$ is employed, which is connected at its forward end to a lateral pin $r'$ on the foot-lever and at its rear end to a stationary part on the frame. To automatically lock the brakes on when the foot-lever $o'$ is pressed forward, a suitable spring-catch $s'$ may be employed, this catch being provided with a notch for the reception of the pin $r'$ and having its forward end working through a vertical staple $t'$ and bent laterally at $u'$ to form a foot-piece by which the latch may be disengaged from pin $r'$ by the driver.

To automatically apply the brakes against the action of the spring $q'$, a lateral pin $v'$ is attached to the rear standard and engaged behind an upright spring-bar $w'$, as shown in Fig. 5, this spring-bar being attached to rock-shaft $x'$, journaled on the frame and having an upright crank-arm $y'$, whose upper end is pivotally connected by a link $z'$ to the foot-lever $o'$. It will be observed that while the seat is in its normal or upright position pin $v'$ forces arm $w'$ forward and through the medium of the connecting parts holds the foot-lever forward against the action of the springs $q'$, thereby normally holding the brakes on the wheels. When the seat is depressed, spring $q'$ draws back the foot-lever and releases the brake-shoes from the wheels, the spring-arm $w'$ being compelled to follow pin $v'$. To lock the seat in its depressed position, as when the driver desires to walk behind the machine while cutting, a lever $a^2$ is employed, which is pivoted to the frame to the rear of the seat-standard and is provided with a notch $b^2$, which is adapted to engage over pin $v'$ and hold the seat down against the action of its springs $e$ and $f$. Thus locking down the seat of course holds the driving mechanism in engagement, the brake-band off the fly-wheel, and the brake-shoes off the supporting-wheels. To lock the seat in its upright position, said lever is provided with a notch $c^2$ at a point above $b^2$, which is, like notch $b^2$, adapted to engage the pin $v'$. When the lever is thrown forward to lock the seat in its upright position, a slight beveled lateral projection $d^2$ above notch $c^2$ strikes against the inward and downward turned end $e^2$ of arm $w'$ and disengages it from pin $v'$, thereby freeing the brake devices, so that they may be applied at will by the foot of the driver. This is particularly desirable while the machine is being transported from place to place over roads. To prevent the downward-extending end $e^2$ from engaging over the rear edge of the lever, said part is provided with a forward-extending plate or arm $f^2$, and to prevent said arm $w'$ from engaging behind pin $v'$ when it is shoved off the same by projection $d^2$ said spring $w'$ is provided with a forward-extending plate $g^2$, which when said arm $w'$ is disengaged from the pin normally bears on the extreme end of said pin.

To hold lever $a^2$ in an upright position and away from the mechanism, a suitable spring stop and guide $h^2$ is employed.

It will be observed from the foregoing that this invention is broad in scope and not confined to the specific construction shown and described, as many changes may be made without departing from the spirit of the invention in the least. Any suitable wheel-braking devices may be employed, and likewise with the braking devices of the cutter mechanism, and also the disengaging devices, the invention consisting in its preferred form in means performing these functions automatically by the rising of the seat when relieved of the weight of the driver.

In view of the fact that our invention is not confined to the specific details shown we desire it understood that where the term "seat member" or "body member" is used in the claims it is intended to include not only a seat, but also any device attached or adjacent thereto which when in its normal position will occupy a position usually occupied by some portion of the body of the driver when he is seated and which will therefore be forced out of its normal position when the driver seats himself.

It will be understood that the wheel-brake does not depend for effectiveness upon the friction of the shoes upon the tires, but acts after the manner of a pawl-and-ratchet device, as the peripheries of all mower-wheels (as is well known) are provided with one or more series of transverse lugs to increase the traction, and the shoes engage these lugs squarely when brought against the tires by the actuating-spring, and thereby act as an absolutely positive stop, making it impossible for the team to draw the machine along without sledding it or stripping the projections from the tire. It will be observed, therefore, that the brake-actuating springs need only be strong enough to draw the shoes to the wheels the instant the seat member is released. In order to facilitate this locking action of the shoes, each shoe is provided at each end with a transverse lip or flange $a^3$.

Having thus fully described our invention, what we claim, and desire to secure by Letters Patent, is—

1. In combination with a mower, a movable body member, a device for normally holding it in position, means actuated by the body member for automatically throwing into operative position the cutting mechanism when the body member is moved out of its normal position by the driver in seating himself, and a manually-operated device for stopping the cutting mechanism independently of the movement of the body member, this device being connected directly to said automatic means.

2. In combination with a mower, a body member and devices for normally elevating it, means actuated by the body member for automatically braking the cutter mechanism and also disengaging it when the body member is elevated, and foot-operated devices for stopping the cutting mechanism independently of the body member, these devices being connected directly to said automatic means.

3. In combination with a mower, a depressible seat member and means for normally elevating it, devices actuated by the seat member for automatically stopping the cutting mechanism when the seat is elevated and automatically freeing it when the seat member is depressed, and foot-operated devices for stopping the cutting mechanism independently of the seat member, these devices being connected directly to said automatic means.

4. The combination with a mower, cutter-driving mechanism normally held out of engagement, means for throwing into engagement the cutter-driving mechanism by the act of the driver in seating himself, and foot-operated devices for throwing the cutter-driving mechanism out of engagement while the driver is in his seat, these devices being connected to and forming part of said means.

5. In combination with a mower, a brake normally tending to brake the cutter mechanism, a depressible body member and means, independent of the means for normally applying the brake, for normally elevating the body member, and means connected to the body member for removing the brake, against its normal tendency, when the body member is depressed.

6. The combination with a mower and a depressible seat member, consisting essentially of a pair of parallel uprights or standards pivotally supported on the frame, a seat, pivotally supported on these uprights, and a spring device for normally maintaining the uprights in an upright position, of means for locking the cutter against action when the seat member is elevated.

7. In combination with a mower, a movable body member and spring-actuated devices for holding it normally in position, means connected to the body member for stopping the cutting mechanism when the body member is allowed to assume its normal position, spring-actuated additional devices for stopping the cutting mechanism, these devices being connected directly to said means and being operable independently of the body member.

8. In combination with a mower, a spring-actuated body member and means connected thereto for normally disengaging the cutter mechanism when the driver leaves his seat, a spring $v$ normally tending to hold the cutter mechanism in engagement against the action of the body member and connected means, and a foot-lever and connections for independently disengaging the cutter mechanism against the action of said spring $v$ while the driver is seated.

9. In combination with a mower, a body member and a device for holding it in its normal position, means connected to the body member for automatically disengaging the cutter mechanism embodying an extensible push-rod, a spring normally tending to hold the cutting mechanism in engagement, and a foot-lever connected to the disengaging devices for the purpose set forth.

10. In combination with a mower, a brake-wheel on one of the shafts of the cutter-driving mechanism, a brake-band normally tending to clasp this wheel, a seat member and means for holding it in its normal position, and means connecting the brake-band to the seat member, whereby the band is expanded when the driver is seated and contracted and applied when the driver leaves his seat.

11. In combination with a mower, a movable body member and a spring for holding it normally in position, means for automatically stopping the cutting mechanism when the body member is allowed to assume its normal position and for throwing it into operative position when the body member is moved out of its normal position, means for locking the body member in either its normal or abnormal position, and spring-actuated additional devices for stopping the cutting mechanism independently of the movement of the body member, these devices being connected directly to said automatic means.

12. In combination with a wheeled mower, a movable seat member and a device for normally holding it in position, means connected to said seat member for disengaging the cutting mechanism when the seat member is allowed to assume its normal position and for throwing it into engagement when the seat member is moved to an abnormal position, and devices connected to said means for automatically directly braking the cutter mechanism independently of the transporting-wheels when the seat member assumes its normal position and for releasing it when the seat member is moved out of its normal position.

In testimony whereof we hereunto affix our signatures, in the presence of two witnesses, this 4th day of April, 1903.

GEORGE JOSEPH PATTON.
STELLER A. MARSTELLER.

Witnesses:
J. B. THORNTON,
A. J. RAMEY.